United States Patent [19]
Jinnai et al.

[11] Patent Number: 5,838,853
[45] Date of Patent: Nov. 17, 1998

[54] OPTICAL WAVEGUIDE

[75] Inventors: Kuniaki Jinnai; Yasunari Kawabata; Norio Takeda, all of Tokyo, Japan

[73] Assignee: Mitsubishi Gas Chemical Company, Inc., Tokyo, Japan

[21] Appl. No.: 779,736

[22] Filed: Jan. 7, 1997

[30] Foreign Application Priority Data

Jan. 9, 1996 [JP] Japan .................................. 8-001521

[51] Int. Cl.$^6$ ...................................................... G02B 6/26
[52] U.S. Cl. ................................ 385/50; 385/46; 385/48; 385/43; 385/49; 385/14
[58] Field of Search .................................. 385/50, 49, 14, 385/45, 46, 48, 43

[56] References Cited

U.S. PATENT DOCUMENTS

| | | | |
|---|---|---|---|
| 5,091,986 | 2/1992 | Arii et al. | 385/48 |
| 5,570,442 | 10/1996 | Arii et al. | 385/46 |
| 5,673,345 | 9/1997 | Saito et al. | 385/49 |

FOREIGN PATENT DOCUMENTS

| | | |
|---|---|---|
| 0 424 913 - A2 | 5/1991 | European Pat. Off. . |
| 0 651 267 - A1 | 5/1995 | European Pat. Off. . |
| 2 634 906 - A1 | 2/1990 | France . |
| 58-117515 | 7/1983 | Japan . |
| 03 154006 | 7/1991 | Japan . |

*Primary Examiner*—John Ngo
*Attorney, Agent, or Firm*—Sterne, Kessler, Goldstein & Fox P.L.L.C.

[57] ABSTRACT

An optical waveguide having stable low branching ratio is disclosed, which includes a primary optical waveguide portion coupled at a input end thereof to an input-side optical fiber. branched optical waveguide portions each having one end continuously connected to a output end of the primary optical waveguide portion and the other ends coupled to a plurality of output-side optical fibers and an introductory waveguide portion coupled to the input end of the primary optical waveguide portion and having a width substantially identical with a core diameter of the input-side optical fiber. Further, there is provided a method of producing an optical branching device in which the optical waveguide is formed.

7 Claims, 3 Drawing Sheets

FIG.1
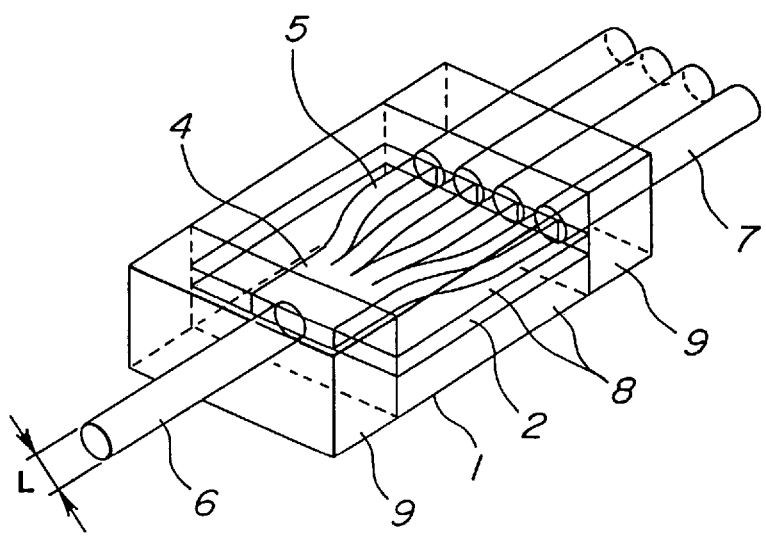
FIG.2(a)   FIG.2(b)
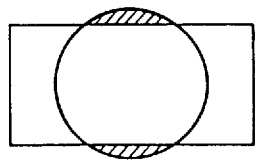   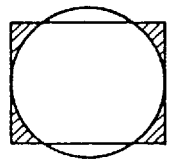

OPTICAL WAVEGUIDE

BACKGROUND OF THE INVENTION

1. Field of the Invention

This invention relates to an optical waveguide for a multi-mode optical branching device used in a fiber-optic local area network (fiber-optic LAN), the optical branching device and a method of producing the optical branching device, and more particularly to an improved structure of an optical waveguide capable of providing an optical branching device which is free from fluctuation in branching accuracy.

2. Prior Art

As is known in the art, optical branching devices have a function of distributing optical signals transmitted through one optical fiber into a plurality of optical fibers and have been utilized as one of essential constituents of fiber-optic LAN.

As primary processes for the production of such optical branching devices, there have been a fusion-bonding-type process in which a plurality of optical fibers are directly fusion-bonded thereto, an optical waveguide-type process to which the present invention pertains and in which an optical fiber is coupled with an optical waveguide, or the like. Among them, the optical waveguide-type process has excellent advantages such as a high degree of freedom in designing, facilitated production of a multi-branching waveguide, a high applicability to mass production, or the like, so that many studies have been made to put such a process into practice.

One example of the optical waveguide-type optical branching devices is illustrated in FIG. 1. Referring to FIG. 1, there is shown the optical waveguide-type optical branching device 1 which includes an optical waveguide element composed of a flat transparent film 2 and upper and lower reinforcing plates 8 between which the flat transparent film is interposed and adhered. The flat transparent film is formed therein with an optical waveguide composed of a primary waveguide portion 4 and branched waveguide portions 5 continuously connected thereto. On opposite sides of the optical waveguide element, there are disposed two optical fiber array members 9 of which one optical fiber array member located on a side of the primary waveguide portion 4 is provided with one input-side optical fiber 6 and bonded to the primary waveguide end of the optical waveguide element, and the other optical fiber array member located on a side of the branched waveguide portions 5 is provided with a plurality of output-side optical fibers 7 and bonded to the branched waveguide end of the optical waveguide element. Light introduced through the input-side optical fiber 6 is transmitted through the optical waveguide and then distributed into the output optical fibers 7.

As primary indices representing a performance of such an optical branching device, there are an excess loss indicative of an entire optical loss thereof and a branching ratio indicative of a degree of fluctuation in an optical power distributed into individual output-side optical fibers. The excess loss represents a value calculated according to the following equation:

Excess Loss $(dB)$ =

$-10 \times$ log (Total intensity of outgoing light/Intensity of incoming light)

On the other hand, the branching ratio means a difference between maximum and minimum values of insertion losses at respective distributed ports, and is represented by the following equation:

Insertion loss $(dB)$ =

$-10 \times$ log (Intensity of outgoing light from one specified port/Intensity of incoming light)

In this case, if the number of branching is "n", n insertion losses are present.

The smaller the insertion loss is, the less the optical loss becomes. Similarly, the smaller the branching ratio is, the less the fluctuation in the distributed optical power becomes. In order to practically utilize the optical branching device, it is important to improve these performances.

The optical loss can be classified into a bonding loss generated at a junction between the optical waveguide and the optical fiber, and a propagation loss generated when light is propagated through the optical waveguide. The bonding loss is further classified into a shape loss due to a difference in dimension or configuration between the optical waveguide and a core of the optical fiber, and a loss due to inconsistency in numerical aperture (hereinafter referred to merely as "NA") therebetween.

These losses are further explained below by referring to the accompanying drawings.

FIG. 2A and 2B are cross-sectional views schematically showing bonding conditions between the optical fiber and the optical waveguide. Of these figures, FIG. 2A illustrates an example of the bonding condition on the input-side and FIG. 2B illustrates an example of the bonding condition on the output-side. In FIGS. 2A and 2B, a circular portion represents a cross section of the optical fiber and a rectangular portion represents a cross section of the optical waveguide. When the optical fiber and the optical waveguide are bonded with each other, the optical losses on the input and output-sides are respectively caused at locations designated by an oblique line in FIGS. 2A and 2B.

The shape loss is more remarkably caused when the optical waveguide has a rectangular cross section. However, in the optical waveguide structure shown in FIG. 4, it is known that the shape loss can be minimized by optimizing a width and a thickness of the optical waveguide. In FIG. 4, reference numeral T denotes a thickness of a core of the optical waveguide, K denotes a core diameter of the optical fiber, W denotes a width of each branched waveguide portion and M denotes a length of the primary waveguide portion.

The present inventors have proposed, in Japanese Patent Application Laid-open No. 15407/91, a method in which, when the optical waveguide is used together with grated index (GI) fibers, the shape loss thereof is reduced by designing the fiber so as to satisfy requirements of the following equations:

$$0.7 \leq T/K \leq 0.85 \quad (1)$$

$$0.35 \leq W/K \leq 0.80 \quad (2)$$

Also, the present inventors have proposed, in Japanese Patent Application Laid-open No. 138606/91, a method for reducing the loss due to inconsistency in NA between the optical waveguide and the optical fibers, in which either a primary waveguide portion or branched waveguide portions or both thereof are formed into a tapered shape expanded toward an output-side.

The propagation loss depends upon a material of the optical waveguide, a production method therefor or the like, and is mainly caused due to light absorption by the material or light scattering by impurities contained in the optical waveguide. In order to reduce the propagation loss, it is required to keep a length of the optical waveguide and a concentration of the impurities in the optical waveguide as low as possible.

The fluctuation in distributed optical powers is caused due to the fact that the intensity of the input light propagated through an multi-mode optical fiber into the primary waveguide portion has such a distribution curve in which a larger intensity portion appears at a center thereof and smaller intensity portions appear at peripheries thereof.

As a method for overcoming the afore-mentioned problem, Japanese Patent Application Laid-open No. 69205/87 has proposed a method in which a central portion of the optical waveguide of such a structure as shown in FIG. 4 is narrower in width as compared with the peripheral portions thereof. Also, Japanese Patent Application Laid-open No. 156407/91 filed by the present inventors discloses a method in which the branching ratio can be improved by designing the optical waveguide so as to optimize a ratio (M/D) of a length (M) to a width (D) of the primary waveguide portion, i.e., so as to satisfy the requirement of the following equation:

$$15 \leq M/D \leq 70 \tag{3}$$

As described in detail above, the optical loss and the branching ratio of the optical waveguide can be improved to some extent by conventional methods of optimizing a design of the optical waveguide.

Incidentally, even if any of conventional methods, i.e., the method in which the central portion of the branched waveguides is relatively narrowed in width as compared with peripheries thereof or the method in which the optical waveguide is designed to render the ratio (M/D) optimum, is adopted, it has however been required to strictly adjust the length of the primary waveguide portion.

This is because distribution of the intensity of light propagated through the branched waveguide portions is varied depending upon the length of the primary waveguide portion and the branching ratio is relied upon conditions of the distribution. Thus, the branching ratio can be stabilized by adjusting the ratio (M/D) to the optimum range defined by the afore-mentioned equation (3). However, needless to say, more strict control of the ratio (M/D) will be useful to further improve the performance of the optical waveguide.

Further, as the length of the primary waveguide portion is increased, the change in distribution of light intensity becomes relatively small, so that the branching ratio can be stabilized. However, at the same time, there arises such a problem that the propagation loss is increased in association with the increase in length of the primary waveguide portion. For this reason, the length of the primary waveguide can be increased only to the limited extent.

That is, when it is intended to attain an optical branching device having a low branching ratio by any of the conventional methods, it has been required to strictly limit the length of the primary waveguide portion to the narrow range.

Further, in the conventional optical waveguide structures, as the number of branched waveguide portions is increased, the width of the primary waveguide portion becomes large relative to the core diameter of the optical fiber. This is because the width of the primary waveguide portion is generally designed as a total widths of the branched waveguide portions.

If the width of each branched waveguide portion is decreased in association with the increase in number of the branched waveguide portions, the width of the primary waveguide portion can be kept constant irrespective of the number of the branched waveguide portions. However, as is apparent from the afore-mentioned equation (2), the width of each branched waveguide portion should be limited to the predetermined range in order to keep the optical loss small. In such an optical waveguide structure in which the primary waveguide portion has a wide width, the distribution of the intensity of light propagated through the primary waveguide portion is also varied depending upon the locations of the optical fibers with respect to the direction of width of the primary waveguide portion. Accordingly, since the change in distribution of light intensity causes change in the branching ratio, it is required to accurately adjust relative positions of the optical fiber and the primary waveguide portion in the direction of the width of the primary waveguide portion.

Conventional methods for controlling the branching ratio is specifically described with reference to a process for the production of the optical branching device.

An optical waveguide is generally formed within a flat transparent film by a photolithographic method or the like. The flat transparent film having the optical waveguide is then interposed between a pair of reinforcing substrates made of plastics, glass, metal or other materials to impart thereto a mechanical strength. Next, input and output end faces of the thus-produced optical waveguide element composed of the flat transparent film having the optical waveguide and the reinforcing substrates, to which end faces the optical fibers are to be bonded in a close contact manner, are abraded until both the end faces are rendered optically flat. On the other hand, opposite end faces of optical fiber array members each composed of a substrate and optical fibers arranged therein and adapted to be bonded to the afore-mentioned abraded input and output end faces of the optical waveguide, are also abraded until these end faces are rendered optically flat. Next, the optical waveguide element having the optical waveguide and the optical fiber array members are placed on an optical bench. After relative positions thereof is adjusted such that when light is incident from the input-side optical fiber, the intensities of the lights emitted from the output-side optical fibers become maximum and uniform, the optical waveguide element having the optical waveguide and the optical fiber array members are fixedly coupled together by adhesion or the like method.

That is, in such a process, the length of the primary waveguide portion is determined by the amount of the optical waveguide removed from the input end face by abrasion. Therefore, there arises a problem that the amount removed from the input end face by abrasion should be strictly controlled to obtain an optical branching device having a suitable small branching ratio. Further, there arises another problem that in the case of an optical branching device having the large number of branched waveguide portions, it is required to strictly adjust relative positions between the optical fiber and the input end of the optical waveguide in the direction of width thereof in order to obtain a desirable branching ratio. This causes such a disadvantage that the adjustment becomes time-consuming,

SUMMARY OF THE INVENTION

It is an object of the present invention to provide an optical branching device capable of exhibiting a low stable branching ratio irrespective of an account of an optical waveguide removed from its input end by abrasion even in the case where the number of branched waveguide portions formed therein is large, and readily adjusting relative positions of the respective components thereof.

As a result of intense studies made by the present inventors in order to attain an optical waveguide structure which can exhibit a constant branching ratio irrespective of an amount of an optical waveguide removed from its input end by abrasion, it has been found that, by further providing an introductory waveguide portion 3 having a width approximately identical with a core diameter of an optical fiber as shown in FIG. 5 on an input-side of the optical waveguide structure as shown in FIG. 4, an optical waveguide having a stable branching ratio can be readily produced. The present invention has been accomplished based on the finding and further studies thereon.

That is, in order to accomplish the afore-mentioned objects, in a first aspect of the present invention, there is provided an optical waveguide for an optical branching device comprising a primary optical waveguide portion having an input end optically coupled to an input-side optical fiber, branched optical waveguide portions each having one end continuously connected to an output end of the primary optical waveguide portion and the other end coupled to each of a plurality of output-side optical fibers, and an introductory waveguide portion coupled to the input end of the primary optical waveguide portion and having a width substantially identical with a core diameter of the input-side optical fiber.

In a second aspect of the present invention, there is provided an optical branching device having an optical waveguide element and input and output optical fiber arrays optically coupled to the optical waveguide element, the optical waveguide element comprising an optical waveguide having a primary optical waveguide portion having an input end optically coupled to an input-side optical fiber of the input optical fiber array, branched optical waveguide portions each having one end continuously connected to an output end of the primary optical waveguide portion and the other end coupled to each of a plurality of output-side optical fibers of the output optical fiber array, and an introductory waveguide portion coupled to the input end of the primary optical waveguide portion and having a width substantially identical with a core diameter of the input-side optical fiber.

In a third aspect of the present invention, there is provided a method of producing an optical branching device in which an optical waveguide is formed by a photolithographic method, comprising the step of forming a primary waveguide portion having an input end optically coupled to an input-side optical fiber, branched waveguide portions each having one end continuously connected to an output end of the primary optical waveguide portion and the other end coupled to each of a plurality of output-side optical fibers, and an introductory waveguide portion coupled to the input end of the primary optical waveguide portion and having a width substantially identical with a core diameter of the input-side optical fiber.

BRIEF DESCRIPTION OF THE DRAWINGS

FIG. 1 is a perspective view showing an example of conventional optical branching devices;

FIG. 2A and 2B are cross-sectional views schematically showing coupling conditions between optical fibers and a conventional optical waveguide;

DETAILED DESCRIPTION OF THE INVENTION

Figure 3:
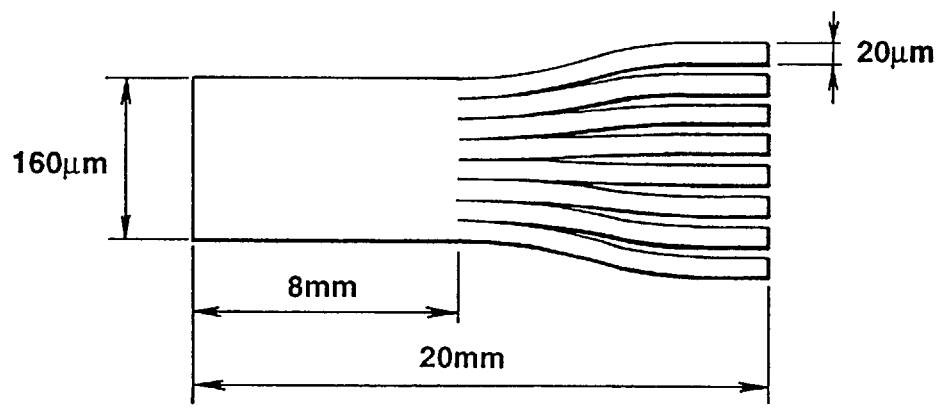
FIG. 3 is a plan view showing a pattern of a conventional quartz photomask used in Comparative Examples of the present application.
Figure 4:
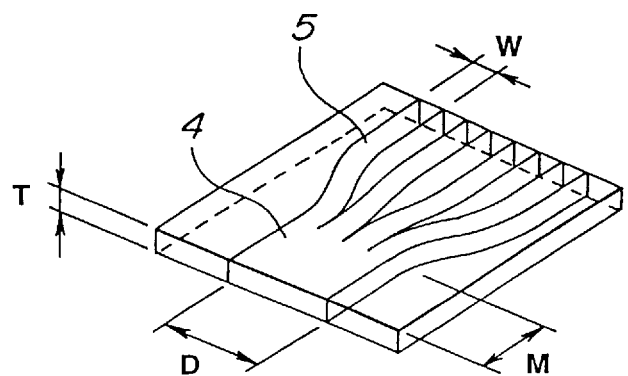
FIG. 4 is a perspective view schematically showing an example of a pattern of a conventional optical waveguide.
Figure 5:
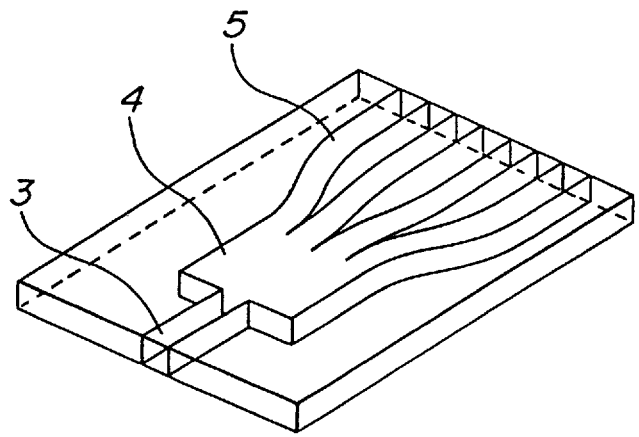
FIG. 5 is a perspective view schematically showing an example of a pattern of an optical waveguide according to the present invention.
Figure 6:
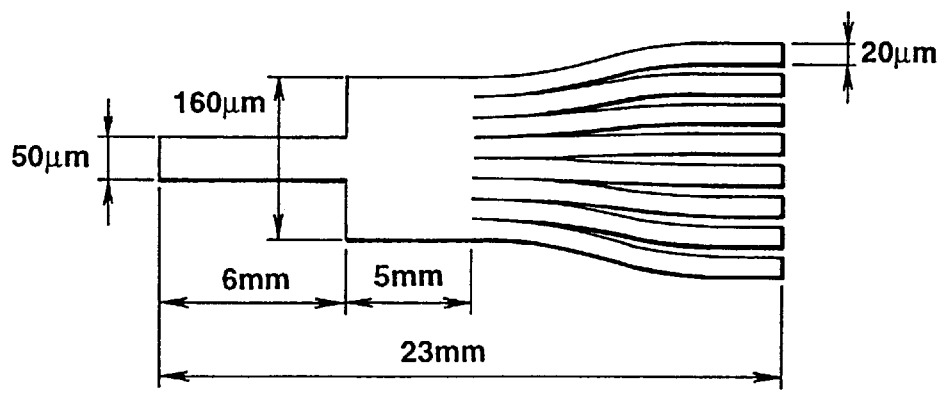
FIG. 6 is a plan view showing a pattern of a quartz photomask used for the production of an optical waveguide according to the present invention.

In accordance with the present invention, an optical waveguide for an optical branching device, which includes a primary optical waveguide portion optically coupled to an input-side optical fiber and branched waveguide portions continuously connected with said primary optical waveguide portion and coupled to a plurality of output-side optical fibers, both waveguide portions being formed within a flat transparent film, is characterized in that an introductory waveguide portion having a width substantially identical with a core diameter of the input-side optical fiber is coupled to the input end of the primary optical waveguide portion. The width of the introductory waveguide portion is substantially the same as a diameter (L) of the input-side optical fiber shown In FIG. 1. However, in general, the width of the introductory waveguide portion may be in the range of 0.9 to 1.1 times the diameter of the input-side optical fiber to be coupled thereto. The introductory waveguide portion is preferably coupled to a substantially central portion of the input end of the primary waveguide portion with respect to the direction of width of the primary waveguide portion.

Further, in accordance with the present invention, there is provided a method of producing an optical branching device provided with the afore-mentioned optical waveguide.

In accordance with the present invention, by designing a length and a width of a primary waveguide portion and a length of each branched waveguide portion so as to be optimum for optical fibers and a light source used, and by adding an introductory waveguide portion having a width approximately identical with a core diameter of the optical fiber to an input end of the primary waveguide portion, there can be obtained an optical waveguide whose primary waveguide portion can have a constant length irrespective of an amount removed from the input end by abrasion and which exhibits a stable branching ratio. Further, in the optical waveguide according to the present invention, relative positions of the optical fiber and the introductory waveguide portion can be readily adjusted such that optical axes thereof are aligned with each other without conventional time-consuming adjustment in the direction of width thereof, so that an optical waveguide having the aimed branching ratio can be produced in an extremely facilitated manner.

Incidentally, the length of the introductory waveguide portion of the optical waveguide according to the present invention is not particularly limited, but can be set to any optional value as far as the introductory waveguide portion is clearly defined and distinguished from the other parts. However, it should be avoided that the length of the introductory waveguide portion is too large, because the propagation loss is increased in proportion to the increase in the length of the introductory waveguide portion. In general, the length of the introductory waveguide portion is preferably in the range of about 0.1 to about 20 mm.

It should be noted that conventionally known methods for improving a branching ratio of the optical waveguide, for example, a method in which the width of central branched waveguide portion is made relatively narrower as compared with those of peripheral branched waveguide portions, are also usefully applicable to the optical waveguide according to the present intention.

Figure 7A:
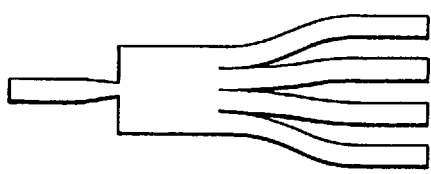
FIG. 7A and 7B are plan views showing other patterns of optical waveguides according to the present invention.
Figure 7B:
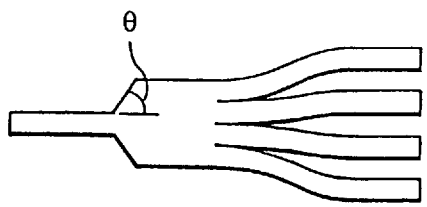

In the optical waveguide according to the present invention, it is not necessarily required that the width of the introductory waveguide portion is kept constant along an entire length thereof, i.e., from the initial end to the terminal end thereof. As shown in FIG. 7A, the introductory waveguide portion may be tapered toward the terminal end thereof, i.e., toward the primary waveguide portion. Furthermore, as shown in FIG. 7B, the introductory waveguide portion can be connected to the primary waveguide portion such that an optional angle q is made therebetween without any limitation.

EXAMPLES

The present invention is described in detail below by way of examples by referring to the accompanying drawings. However, these examples should not be construed to limit preferred embodiments and the scope of the present invention.

Example 1

(a) Designing and production of photomask

An eight-branching waveguide for GI fiber having a core diameter of 50 $\mu$m was designed and a quartz photomask was produced. Dimensions of essential portions were as follows: entire length: 23 mm, length of introductory waveguide portion: 6 mm, length of primary waveguide portion: 5 mm, width of introductory portion: 50 $\mu$m, width of primary waveguide portion: 160 $\mu$m, and width of branched waveguide portion: 20 $\mu$m.

(b) Production of optical waveguide:

An optical waveguide was produced by a selective photopolymerization method disclosed in Japanese Patent Publication No. 3522/81.

That is, a mixture of polycarbonate (Tradename "IUPILON Z" manufactured by Mitsubishi Gas Chemical Co., Ltd.) synthesized from bisphenol Z, methyl acrylate as a photo-reactive monomer and benzoin ethyl ether as a photopolymerization initiator was shaped into a film. The photomask produced in the above item (a) was laminated over the film. The thus-formed laminated film was exposed to an ultraviolet radiation by an ordinary method to polymerize an exposed portion of methyl acrylate monomer.

Next, a non-exposed portion of methyl acrylate monomer was dried in vacuum and removed so that a polymer film having a thickness of 40 $\mu$m was obtained. The polymer film was composed of a single phase portion made of polycarbonate solely which corresponds to the non-exposed portion, and a mixed phase portion made of polycarbonate and the methyl acrylate monomer which corresponds to the exposed portion.

(c) Assembly of optical branching device:

Production of optical waveguide element:

The film in which the optical waveguide was formed, was interposed between two glass plates through adhesive layers also functioning as upper and lower clad layers and having a refractive index of 1.57, so that an optical waveguide element was produced. Thereafter, opposite end faces of the thus-produced optical waveguide element to which optical fibers were bonded were abraded until these end faces were rendered optically flat. The abraded optical waveguide element was provided therein with an optical waveguide whose entire length was 21 mm and which contained an introductory waveguide portion having a length of 5 mm.

Production of optical fiber array members

One bare optical fiber was placed on an approximately central portion of a substrate and fixedly adhered thereto by an ordinary method to produce an input-side optical fiber array member. An end face of the input-side optical fiber array member which end face was brought into contact with the optical waveguide was abraded until the end face was rendered optically flat.

Similarly, eight bare optical fibers were placed on an approximately central portion of another substrate such that these strands were arranged in a row and brought into parallel and close contact with each other, and fixedly adhered thereto, so that an output-side optical fiber array member was produced. An end face of the output-side optical fiber array member which end face was brought into contact with the optical waveguide was abraded until the end face was rendered optically flat.

Coupling of optical waveguide with optical fiber

The optical waveguide element and the optical fiber array members were placed on an optical bench such that the optical fibers were located on opposite sides of the optical waveguide. Further, relative positions of the optical waveguide element having the optical waveguide and the optical fiber array members were adjusted such that, when light having a wavelength of 0.85 $\mu$m was introduced through the input-side optical fiber, a sum of intensities of eight outgoing light beams emitted from the output-side optical fibers was minimized and the intensities of the eight outgoing light beams became uniform. Thereafter, an adhesive was applied to the opposite end faces between the optical waveguide element having the optical waveguide and the input-side optical fiber array member and between the optical waveguide element having the optical waveguide and the output-side optical fibers and then cured, so that an optical branching device was produced.

Measurement

Using a stabilized light source (AQ-1314) and an optical power meter (AQ-1111) both manufactured by Ando Electric Co., Ltd., the intensities of the outgoing light beams emitted from the optical branching device were measured by an ordinary method to obtain an excess loss and a branching ratio thereof. The results are shown in Table 1.

Examples 2 to 5

Optical waveguide elements each having an optical waveguide were produced in the same manner as described in Example 1, except that the amounts removed from input end faces of the optical waveguide elements by abrasion were adjusted such that introductory waveguide portions having lengths of 4 mm, 3 mm, 2 mm and 1 mm, respectively, were formed. Further, the same procedure as in Example 1 was conducted to produce input-side and output-side optical fiber array members and couple these array members to the optical waveguide element having the optical waveguide. The thus-produced optical branching devices were subjected to the measurements in the same manner as in Example 1. The results are also shown in Table 1.

Comparative Examples 1 to 5

(a) Designing and production of photomask

Eight-branching waveguides for GI fibers having a core diameter of 50 $\mu$m were designed and quartz photomasks therefor were produced in the same manner as in Example 1 except that each quartz photomask had no introductory waveguide portion as shown in FIG. 3. Dimensions of essential parts of each quartz photomask were 20 mm in entire length, 8 mm in length of primary beam waveguide portion, 160 $\mu$m in width of primary beam waveguide portion and 20 $\mu$m in width of branched waveguide portion (FIG. 3).

Production of optical waveguide

Optical waveguides were produced in the same manner as in Example 1.

(c) Assembly of optical branching device

Production of optical waveguide element

Optical waveguide elements each having an optical waveguide were produced in the same manner as in Example 1, except that the amounts removed from input end faces of the optical waveguide elements by abrasion were adjusted such that introductory waveguide portions having lengths of 7 mm, 6 mm, 5 mm and 4 mm, respectively, were formed. Further, the same procedure as in Example 1 was conducted to produce input-side and output-side optical fiber array members and couple these array members to the optical waveguide element having the optical waveguide. The thus-produced optical branching devices were subjected to the measurements in the same manner as in Example 1. The results are also shown in Table 1

TABLE 1

|  | Number of branched waveguide portions | Length of introductory waveguide portion (mm) | Length of primary waveguide portion (mm) | Excess loss (dB) | Branching ratio (dB) |
| --- | --- | --- | --- | --- | --- |
| Example 1 | 8 | 5.0 | 5.0 | 0.70 | 0.22 |
| Example 2 | 8 | 4.0 | 5.0 | 0.66 | 0.25 |
| Example 3 | 8 | 3.0 | 5.0 | 0.63 | 0.21 |
| Example 4 | 8 | 2.0 | 5.0 | 0.62 | 0.26 |
| Example 5 | 8 | 1.0 | 5.0 | 0.56 | 0.22 |
| Comparative Example 1 | 8 | — | 7.0 | 0.65 | 0.75 |
| Comparative Example 2 | 8 | — | 6.0 | 0.62 | 0.67 |
| Comparative Example 3 | 8 | — | 5.0 | 0.61 | 0.26 |
| Comparative Example 4 | 8 | — | 4.0 | 0.57 | 0.50 |
| Comparative Example 5 | 8 | — | 3.0 | 0.55 | 0.76 |

As is apparent from Table 1, in the case of the optical waveguides having no introductory waveguide portion (Comparative Examples), the length of the primary beam waveguide portion was varied depending upon the amount of the optical waveguide abraded, so that the branching ratio of the optical waveguides were fluctuated to a great extent. On the other hand, in the case of the optical waveguides each having the introductory waveguide portion, the length of the primary beam waveguide portion thereof could be kept constant irrespective of the amount of the optical waveguide abraded (i. e., the length of the introductory waveguide portion). As a result, it was confirmed that stable low branching ratios could be obtained. In addition, it was found that the increase in excess loss of the optical waveguide was limited to an extremely low level by providing the introductory waveguide portion.

As described above, in accordance with the present invention, fluctuations in length of a primary beam waveguide portion and branching ratio of an optical waveguide, the latter being conventionally caused due to inaccurate positioning in the direction of width of the primary beam waveguide portion, can be prevented by such a modification that introductory waveguide portion is simply added to the conventional optical waveguide, whereby an optical branching device having a high performance can be readily produced with a high yield.

What is claimed is:

1. An optical waveguide for an optical branching device comprising:

a primary optical waveguide portion having an input end optically coupled to an input-side optical fiber;

branched optical waveguide portions each having one end continuously connected to an output end of said primary optical waveguide portion and the other end coupled to each of a plurality of output-side optical fibers; and an unbranched introductory waveguide portion coupled to said input end of said primary optical waveguide portion and having a width substantially identical with a core diameter of said input-side optical fiber.

2. An optical waveguide according to claim 1 wherein said optical waveguide is formed within a flat transparent film.

3. An optical waveguide according to claim 1, wherein said introductory waveguide portion was coupled to a central portion of said input end of the primary waveguide portion with respect to the direction of width of said primary waveguide.

4. An optical waveguide according to claim 1, wherein said introductory waveguide portion is provided between said input-side optical fiber and said primary optical waveguide portion.

5. An optical waveguide according to claim 1, wherein the length of said introductory waveguide portion is in the range of 0.1 mm to 20 mm.

6. An optical branching device having an optical waveguide element and input and output optical fiber arrays optically coupled to the optical waveguide element, said optical waveguide element comprising an optical waveguide having:

a primary optical waveguide portion having an input end optically coupled to an input-side optical fiber of said input optical fiber array;

branched optical waveguide portions each having one end continuously connected to an output end of said primary optical waveguide portion and the other end coupled to each of a plurality of output-side optical fibers of said output optical fiber array; and an unbranched introductory waveguide portion coupled to said input end of said primary optical waveguide portion and having a width substantially identical with a core diameter of said input-side optical fiber.

7. A method of producing an optical device in which an optical waveguide is formed by a photolithographic method, comprising the step of:

forming a primary waveguide portion having an input end optically coupled to an input-side optical fiber;

branched waveguide portions each having one end continuously connected to an output end of said primary optical waveguide portion and the other end coupled to each of a plurality of output-side optical fibers; and an unbranched introductory waveguide portion coupled to said input end of the primary optical waveguide portion and having a width substantially identical with a core diameter of said input-side optical fiber.

* * * * *